Dec. 12, 1933.  F. J. BEIGHEY  1,938,794

VULCANIZER

Filed April 25, 1930

INVENTOR
Fred J. Beighey
BY
ATTORNEY

Patented Dec. 12, 1933

1,938,794

UNITED STATES PATENT OFFICE 1,938,794

VULCANIZER

Fred J. Beighey, St. Clair Shores, Mich., assignor to Morgan & Wright, Detroit, Mich., a corporation of Michigan Application April 25, 1930. Serial No. 447,137

2 Claims. (Cl. 18—38)

My invention relates to vulcanizing apparatus and more particularly to automatic connections between a source of fluid under pressure and the interior of curing bags used in vulcanizing apparatus.

In vulcanizing tires it is common practice to place a curing bag within a tire carcass and then place the assembled carcass and bag between complementary mold sections. The curing bag is inflated with fluid under pressure for expanding the tire carcass and holding it against the mold sections during the vulcanizing operation. In many cases the expansion of the tire carcass is sufficiently great to cause it to take impressions from the mold surfaces. The problem of connecting such curing bags to an external source of fluid under pressure has given manufacturers and operators of such devices considerable difficulty. As such apparatus is used many times during a working day, the time consumed in connecting and disconnecting couplings is considerable where threaded couplings or the like are used. As the fluid used in curing bags is under considerable pressure it is necessary that a tight joint be obtained. In some cases hot water is circulated through the curing bags and a leakage of such hot water might be dangerous to an operator.

I am aware that attempts have heretofore been made to provide connections for such curing bags which are automatically closed upon the assembly of the mold. However, such structures have either been so complicated or uncertain in their operation as to prevent their wide acceptance by the industry.

I provide a connector for curing bags used in vulcanizers in which an adapter is carried by the conventional tube found in curing bags. The adapter is confined between brackets on the mold sections when the mold is assembled without requiring any special assembling operation. The adapter comprises a metallic body portion having recesses in faces normally co-operating with surfaces of the clamping brackets. Hollow resilient inserts having an oval shape in cross-section are placed in the recesses with tapering edge portions projecting slightly outwardly beyond the body of the adapter, so that when the mold is closed and internal pressure is applied, the projecting portions of the resilient material are slightly compressed by the mold surfaces, and the internal fluid pressure on the tapering edge portions forces them against the mold faces to form a liquid tight seal with the co-operating bracket surfaces. While my invention may be used in gang molds, it is particularly useful in connection with single molds or unit vulcanizers, as they are frequently called. Where it is desired to circulate fluid under pressure through the curing bag, a plurality of connections are made at different portions of the mold so that at least one of the connections serve as an inlet and another serves as an outlet.

The accompanying drawing illustrates a present preferred embodiment of the invention, in which Figure 1 is a perspective view of an adapter embodying my invention;

Figure 1:
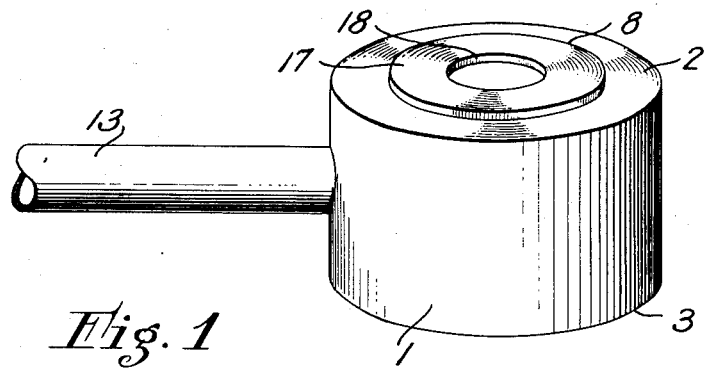
Figure 2:
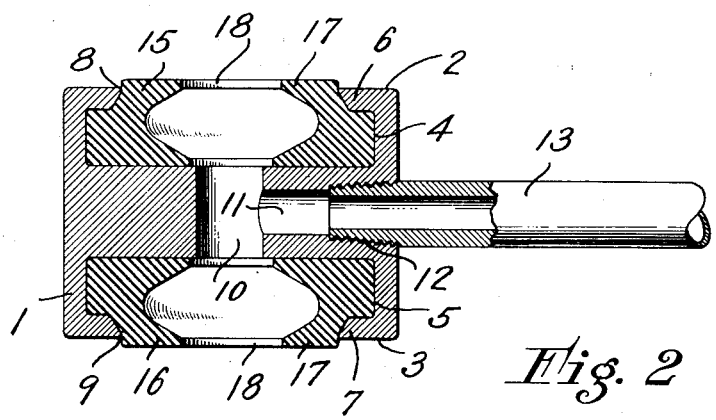
Fig. 2 is a partial vertical sectional view of the adapter shown in Fig. 1.

Referring to Figs. 1 and 2, an adapter comprises a body portion 1 preferably of metal. The body portion is illustrated in the form of a cylinder with oppositely disposed flat surfaces 2 and 3. The end portions of the body are provided with recesses 4 and 5 having overhanging walls 6 and 7, respectively. The walls 6 and 7 define openings 8 and 9, respectively. A passageway 10 extends between the recesses 4 and 5. A branch passageway 11 communicates with the passageway 10 and terminates in a threaded portion 12 for the reception of a pipe or tube 13, which is connected to the conventional curing bag 14, as shown in Fig. 3.

Resilient inserts 15 and 16, preferably of rubber, having internal ovaloidal hollow spaces in cross-section are forced into the recesses 4 and 5, respectively, where they are held by the overhanging shoulders 6 and 7. Tapering edge portions 17 of the inserts extend outwardly of the openings 8 and 9 beyond the surfaces 2 and 3 for constituting seals as hereinafter described. The inserts 15 and 16 are provided with tapered openings registering with the passageway 10 on the inner surfaces and have openings 18 at their outer surfaces.

Figure 3:
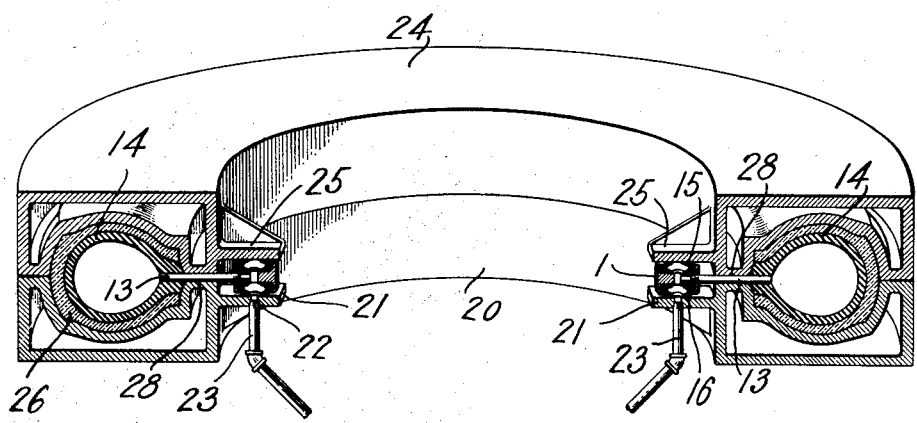
Fig. 3 is a transverse sectional view of a vulcanizer embodying my invention.

Referring to Fig. 3, the curing bag 14 may be provided with one or more tubes 13 terminating in adapters 1. If it is desired merely to inflate the curing bag during the vulcanizing operation, one connection is sufficient. However, if it is desired to circulate fluid during the vulcanizing operation at least two connections are required, one of which serves as an inlet and the other of which serves as an outlet. The latter construction is desirable where hot water, or the like, is circulated through the curing bag to maintain its temperature during the vulcanizing operation.

In assembling a vulcanizer of the unit type, a lower mold section 20, which is preferably stationary, is provided with one or more sealing brackets 21, each having an opening 22 for the connection of a fluid conduit 23. It is to be understood that in practice each conduit 23 is provided with suitable valves, not shown, for controlling fluid movement thereto. A second mold section 24 which is movable relative to the mold section 20, and which in practice is often hinged thereto, is provided with one or more brackets 25 in alinement with the brackets 21 on the other mold section. Accordingly, the brackets 21 and 25 are arranged in pairs and spaced a distance substantially corresponding to the length of the adapter 1.

In assembling the vulcanizer, a tire casing 26 is placed around the curing bag 14 and both are placed in the mold section 20 with the tube or tubes 13 carried by the curing bag projecting through passageways 28 formed in the mold sections.

An adapter 1 is secured to the end of each tube and rests on a bracket 21 with one of the openings 18 in communication with a duct 23. When the section 24 of the mold is placed in position and clamped, the resilient inserts 15 and 16 are slightly compressed between the brackets 21 and 25. The compression of the inserts causes the projecting portions 17 to be flattened against the faces of the brackets, and the internal fluid pressure forces the tapering edges of the inserts against the surfaces of brackets 21 and 25 and the adapter 1 at the passageway 10, thereby constituting fluid tight seals. The seals are completed automatically and without necessitating any particular assembly operation on the part of the operator. Fluid is admitted to and/or circulated through the curing bag. As each conduit 23 is in registry with an opening 18 in the adapter and the opposite opening 18 is closed by the bracket 25, fluid traverses the passageways 10 and 11 and the tube 13 to or from the curing bag 14.

Upon the separation of the mold section 24 from the mold section 20 the connection is broken by lifting the brackets 25 from the adapters 1 and by lifting curing bag 14 out of the mold section 20.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A vulcanizer comprising a substantially stationary and a relatively movable section, complementary pairs of alined sealing brackets carried by said sections and separated from each other for the reception of removable adapters constituting parts of inlet and outlet means for the vulcanizer, and a fluid conduit connected to the stationary bracket of each pair for communication with the confined adapter.

2. A vulcanizer comprising a substantially stationary and a relatively movable section, complementary pairs of alined sealing brackets carried by said sections and separated from each other for the reception of removable adapters constituting parts of inlet and outlet means for the vulcanizer, the stationary bracket having a passageway formed therein, and a fluid conduit connected to said passageway for communication with the confined adapter.

FRED J. BEIGHEY.